US009003148B2

(12) United States Patent
Ono et al.

(10) Patent No.: US 9,003,148 B2
(45) Date of Patent: *Apr. 7, 2015

(54) MICROCOMPUTER AND METHOD FOR CONTROLLING MEMORY ACCESS

(71) Applicant: Renesas Electronics Corporation, Kawasaki, Kanagawa (JP)

(72) Inventors: Rika Ono, Kanagawa (JP); Hitoshi Suzuki, Kanagawa (JP)

(73) Assignee: Renesas Electronics Corporation, Kawsaki-shi, Kanagawa (JP)

( * ) Notice: Subject to any disclaimer, the term of this patent is extended or adjusted under 35 U.S.C. 154(b) by 223 days.

This patent is subject to a terminal disclaimer.

(21) Appl. No.: 13/665,639

(22) Filed: Oct. 31, 2012

(65) Prior Publication Data

US 2013/0132694 A1 May 23, 2013

(30) Foreign Application Priority Data

Apr. 20, 2006 (JP) .................................. 2006-116954

(51) Int. Cl.
*G06F 12/00* (2006.01)
*G06F 12/14* (2006.01)

(52) U.S. Cl.
CPC .......... *G06F 12/145* (2013.01); *G06F 12/1441* (2013.01); *G06F 12/1491* (2013.01)

(58) Field of Classification Search
CPC . G06F 11/2007; G06F 11/22; G06F 13/4022; G06F 9/3834; G06F 11/348; G06F 13/34; G06F 2201/86; G06F 2201/88; G06F 2201/885; G06F 9/3004; G06F 9/30087; G06F 9/3009; G06F 9/3851; G06F 9/4843
USPC ................. 711/100, 111–112, 152, 163–164; 365/185.04, 195, 196, 230.01, 230.03
See application file for complete search history.

(56) References Cited

U.S. PATENT DOCUMENTS 5,600,818 A    2/1997  Weikmann
5,826,007 A   10/1998  Sakaki (Continued)

FOREIGN PATENT DOCUMENTS

JP    02155057         6/1990
JP    06-052054 A      2/1994

(Continued)

OTHER PUBLICATIONS

Japanese Notification of Reasons for Refusal dated Apr. 23, 2013, with English-language translation.
United States Office Action dated Apr. 12, 2011 in U.S. Appl. No. 11/785,536.
United States Office Action dated Sep. 1, 2010 in U.S. Appl. No. 11/785,536.

(Continued)

*Primary Examiner* — Gurtej Bansal
*Assistant Examiner* — Zhuo H Li
(74) *Attorney, Agent, or Firm* — McGinn IP Law Gorup, PLLC

(57) ABSTRACT

A microcomputer includes a CPU, a protection information storage configured to store memory protection information specifying an access permission or a prohibited state to a memory space by a program executed by the CPU, a memory access control apparatus configured to determine whether or not to allow a memory access request from the CPU according to the memory protection information, and a reset apparatus configured to invalidate the memory protection information stored in the protection information storage according to a reset request signal output from the CPU to a switching of programs executed by the CPU, the reset request signal being based on a state of execution of the program by the CPU. The reset apparatus sets all valid bit storing fields of a plurality of protection setting registers of the protection information storage to invalid state in response to the reset request signal output by the CPU.

23 Claims, 9 Drawing Sheets

(56) References Cited

U.S. PATENT DOCUMENTS

| | | | |
|---|---|---|---|
| 6,026,016 | A | 2/2000 | Gafken |
| 6,253,281 | B1 | 6/2001 | Hall |
| 7,117,328 | B2 | 10/2006 | Shibuya |
| 8,312,238 | B2 * | 11/2012 | Ono et al. .................. 711/163 |
| 2004/0234073 | A1 | 11/2004 | Sato |
| 2005/0138481 | A1 | 6/2005 | Taniguchi |

FOREIGN PATENT DOCUMENTS

| | | |
|---|---|---|
| JP | 2000-339189 A | 12/2000 |
| JP | 2003-242030 A | 8/2003 |
| JP | 2004-355383 A | 12/2004 |

OTHER PUBLICATIONS

United States Office Action dated Apr. 10, 2012 in U.S. Appl. No. 11/785,536.

"ARM1156T2F-S Technical Reference Manual Rev.R0p0", ARM ltd., Oct. 25, 2005, <www.arm.com/pdfs/DDI0290C_arm1156t2fs_r0p0_trm.pdf>, Chapter 3 pp. 61-60 and Chapter 5 p. 7.

"TriCore. 1 32-Bit Unified Processor Core vol. 1: V1.3 Core Architecture", Infineon Technologies, Oct. 2005, www.infineon.com/upload/Document/TriCore_1_um_voll_Core_Architechtrue.pdf, Chapter 8 pp. 4-10 and Chapter 8 p. 13.

Japanese Office Action dated Jun. 21, 2011 with partial English Translation.

* cited by examiner

MICROCOMPUTER AND METHOD FOR CONTROLLING MEMORY ACCESS

INCORPORATION BY REFERENCE

This present application is a Continuation Application of U.S. patent application Ser. No. 11/785,536, filed on Apr. 18, 2007, based upon and claims the benefit of priority from Japanese patent application No. 2006-116954, filed on Apr. 20, 2006, the disclosure of which is incorporated herein in its entirety by reference.

BACKGROUND OF THE INVENTION

1. Field of the Invention

The present invention relates to a microcomputer having a memory access control mechanism for determining whether to allow a memory access for a CPU.

2. Description of Related Art

Microcomputers mounted to transport machineries including automobiles and aircrafts and communication devices including and cellular phones and telephone switches to control these machineries and devices are referred to as embedded systems. An embedded system generally has a multi-programming environment in order to improve the processing time, secure real-time and improve the productivity by software componentization of a program. The multi-programming environment is an environment to show as if several application programs are executed in parallel by periodically switching several application programs to execute or switching the application programs in response to a generation of an event. Such multi-programming environment is realized by a CPU and system program handling to schedule the application programs executed by the CPU. A program unit executed in parallel in a multi-programming environment is hereinafter referred to as a task.

Conventionally in the embedded system, a memory protection function for restricting a memory space that is accessible to each task has not been considered as important. However in recent years, there are embedded systems capable of executing programs with uncertified reliability. For example, a cellular phone capable of downloading and executing Java (trademark of Sun Microsystems, Inc.) programs is commercialized. In such system, it is necessary to protect a system program and other application programs from programs with uncertified reliability. Further, there are demands for facilitating to debug in a software development process by separating the memory space by each application program of software component constituting the application program. With such background, an importance of the memory protection function in the microcomputer is increasing.

Memory protection, a control of memory access in a microcomputer, is performed by setting an area in the memory space to allow or to prohibit an access as memory protection information and then verifying a memory access request from CPU with the memory protection information. Specifically, if a memory address included in a memory access request is contained in an access permission area, the memory access is permitted. If the memory address is contained in an access prohibited area, the memory access is prohibited. Further, if the memory area used when executing a program is divided by each application program or task, it is necessary to change the memory area to allow an access in accordance with the switching of the programs to be executed. Accordingly the memory protection information is rewritten when the program is switched. A microcomputer having such memory protection function is disclosed in "ARM1156T2F-S Technical Reference Manual Rev.R0p0", ARM Ltd., 25 Oct. 2005, <www.arm.com/pdfs/DDI0290C_arm1156t2fs_r0p0_trm.pdf>, Chapter 3 pp. 61-69 and Chapter5 p. 7, and "TriCore.132-Bit Unified Processor Core Volume 1: V1.3 Core Architecture", Infineon Technologies, October 2005, <www.infineon.com/upload/Document/TriCore_1_um_vol1_Core_Architecture.pdf>, Chapter 8 pp. 4-10 and Chapter 8 p. 13.

The microcomputer disclosed by ARM Ltd. includes a memory protection unit. The memory protection unit further includes 16 protection setting registers for determining an area to allow memory accesses. A base address of the area to allow an access, the size of the access permission area and a valid bit for indicating whether the setting by the protection setting register is valid or invalid are stored in each protection setting register. The memory protection unit compares the memory address of the memory area that is requested by the CPU with the access permission area defined by the protection setting register having a valid bit set to valid. The memory protection unit determines whether to allow a memory access or not depending on whether the memory address that the CPU has issued an access request is included in the access permission area defined by the protection setting register having a valid bit set to valid.

On the other hand, the microcomputer disclosed by Infineon Technologies includes a plurality of protection setting registers capable of determining 4 ways of access permission areas for each of a data and an instruction area. A lower bound address and an upper bound address for the access permission area and a protection mode of the setting in the protection setting register are set to each of the protection setting registers. The protection mode is information indicating to allow/prohibit a write access, a read access and an execution that corresponds to the valid bit in the microcomputer disclosed by ARM Ltd.

The microcomputers disclosed by ARM Ltd. And Infineon Technologies sequentially updates the content of the protection setting registers according to the switching of the programs carried out by the CPU so as to set memory protection information for a program to be newly executed. Specifically, by sequentially performing processes to set a valid bit of a protection setting register to invalid, to set a permission area in the protection setting register and set a valid bit of the protection setting register having a determined permission area to valid state to all the protection setting registers, an access permission area for a newly executed program can be set.

As described in the foregoing, the microcomputers disclosed by ARM Ltd. and Infineon Technologies sequentially rewrites the protection setting registers when the program to be executed is switched. Therefore, it has now been discovered that the protection setting registers are likely to be failed being rewritten.

SUMMARY OF THE INVENTION

According to an aspect of the present invention, there is provided a microcomputer that includes a CPU, a protection information storage configured to store memory protection information specifying an access permission or prohibited state to a memory space by a program executed by the CPU, a memory access control apparatus configured to determine whether or not to allow a memory access request from the CPU according to the memory protection information and a reset apparatus configured to invalidate the memory protection information stored in the protection information storage according to a reset request signal output from the CPU.

With the reset apparatus operating according to the reset request signal output from the CPU, the memory protection information stored in the protection information storage can be invalidated. This prevents residual settings of the past memory protection information caused by omission of rewriting the protection information storage and also improves the reliability of memory access control by getting the reset apparatus to work prior to updating the memory protection information according to the program to be newly executed by CPU.

According to a second aspect of the present invention, there is provided a microcomputer that includes a CPU configured to switch a plurality of programs to execute, a plurality of protection information storages configured to store memory protection information specifying either an access permission or prohibited state to a memory space by a program executed by the CPU, a memory access control unit configured to evaluate whether or not to allow a memory access request from the CPU according to the memory protection information, an invalidating unit configured to invalidate memory protection information corresponding to a past executed program retained in the plurality of protection information storages in response to a switching of programs executed by the CPU and an updating unit configured to update content of the plurality of protection information storages by memory protection information corresponding to a newly executed program by the CPU after invalidating the memory protection information by the invalidating unit.

As described in the foregoing, prior to updating the memory protection information according to the program to be newly executed by CPU, past memory protection information is invalidated. This prevents the past memory protection information from remaining and also improves the reliability of memory access control.

According to a third aspect of the present invention, there is provided a method for controlling memory accesses of a microcomputer, the microcomputer including a CPU, a plurality of protection information storages configured to store memory protection information indicating either an access permission or prohibited state to a memory space by a program to be executed by the CPU and a memory access control unit configured to evaluate whether or not to allow a memory access request by the CPU according to the memory protection information. The method includes invalidating past memory protection information stored in the plurality of protection information storages according to a switching of programs executed by the CPU and updating content of the plurality of protection information storages by memory protection information corresponding to a newly executed program by the CPU after invalidating the memory protection information.

As described in the foregoing, prior to updating the memory protection information according to the program to be newly executed by CPU, past memory protection information is invalidated. This prevents the past memory protection information from remaining caused by failing to rewrite the protection information storage and also improves the reliability of memory access control.

The present invention provides a microcomputer capable of improving the reliability of memory access control and a method for controlling memory accesses.

BRIEF DESCRIPTION OF THE DRAWINGS

The above and other objects, advantages and features of the present invention will be more apparent from the following description taken in conjunction with the accompanying drawings, in which.

DESCRIPTION OF THE PREFERRED EMBODIMENTS

Figure 1:
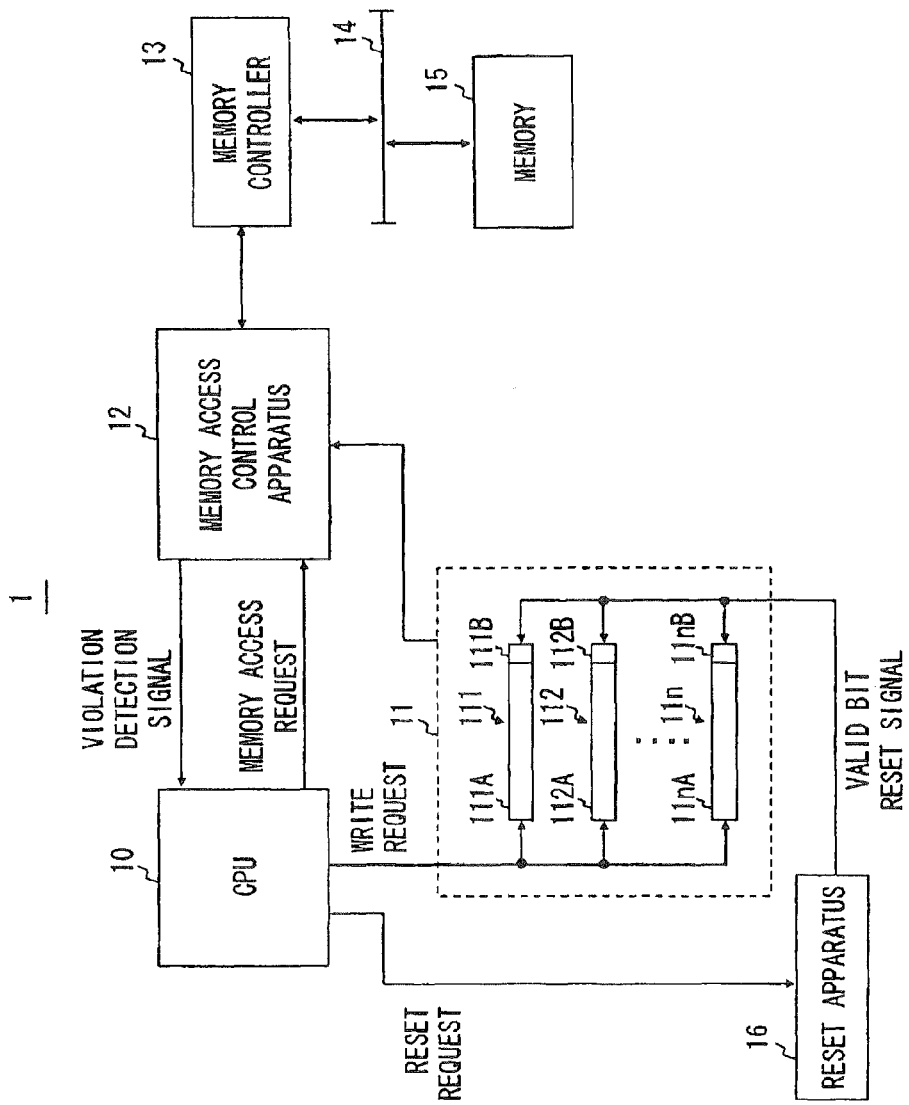
FIG. 1 is a configuration diagram showing a microcomputer according to a first embodiment of the present invention.

The invention will be now described herein with reference to illustrative embodiments. Those skilled in the art will recognize that many alternative embodiments can be accomplished using the teachings of the present invention and that the invention is not limited to the embodiments illustrated for explanatory purposes.

In the drawings, like parts are marked throughout the drawings with the same reference numerals, respectively with detailed explanations not repeated as appropriate for the clarity.

First Embodiment

A configuration of a microcomputer 1 of this embodiment is shown in FIG. 1. In FIG. 1, CPU (Central Processing Unit) 10 reads out an instruction from a memory 15, decodes the readout instruction and carries out a process corresponding to the instruction for example an arithmetical operation and a logical operation or a read and write access from/to the memory 15.

A protection setting register group 11 is a protection setting storage unit configured to store a protection setting of the memory 15. The protection setting register group 11 includes n number of protection setting registers 111 to 11n. In this embodiment, one protection setting register specifies one access permission area. To be more specific, the protection setting registers 111 to 11n each has an area specifying field to indicate an area to permit an access and a valid bit storing field to store a valid bit. The valid bit indicates valid or invalid of the setting by each protection setting register. For example the protection setting register 111 includes an area specifying field 111A and a valid bit storing field 111B. Note that specifying a permission area by area specifying fields 111A to 11nA may be performed by specifying a base address of the area to allow accesses and the size of the access permission area or lower and upper bound addresses of the area to allow an access. Furthermore, each of valid bit storing fields 111B to 11nB is a 1 bit storage area, indicating an invalid state when a stored value is "0" and a valid state when the stored value is "1". The protection register group 11 is rewritten according to a write request output from the CPU 10.

A memory access control apparatus 12 inputs a memory access request for the memory 15 that is generated by the CPU 10. The memory access request generated by the CPU 10 includes the type of read/write and a memory address indicates the access destination, and for a write access, the memory access request further includes write data. The memory address indicates the access destination is specified by a base address and a size of data requested for transfer.

The memory access control apparatus 12 received with the memory access request determines whether to allow the memory access request by comparing the memory address the CPU 10 is requesting to access with the setting of each of the protection setting registers 111 to 11n. Specifically, if the memory address the CPU is requesting to access is included in the access permission area defined by a protection setting register having a valid bit set to valid among the protection setting registers 111 to 11n, the memory access control apparatus 12 allows a memory access. On the other hand, if the memory address the CPU is requesting to access is not included in the access permission area, the memory access control apparatus 12 does not allow a memory access and outputs a violation detection signal to the CPU 10 indicating an occurrence of an invalid access. To simplify the drawings, the connections between each of the protection setting registers 111 to 11n and memory access control apparatus 12 are not illustrated and the connections are illustrated by a connection line between the protection setting register group 11 and memory control apparatus 12.

A memory controller 13 inputs the memory access request allowed by the memory access control apparatus 12 and accesses an area of the memory 15 corresponding to the address specified by the memory access request. For a read access, data read out from the memory 15 is transferred to the CPU 10. For a write access, the data is written to the memory 15.

The memory 15 is connected with the memory controller 13 via the memory bus 14. The memory 15 is used as a storage area for a system program and application programs read out to the CPU 10 to be executed and a storage area for data used by the system program and the application programs. That is, the memory 15 is a combination of RAM, ROM and flash memory or the like. Further, the memory bus 14 is a collective term of an address bus and a data bus.

A reset apparatus 16 sets the valid bit storing fields 111B to 11nB of n number of the protection setting registers 111 to 11n to invalid state in response to a reset request signal output by the CPU 10. In this embodiment, the memory access is allowed by setting the valid bit storing fields 111B to 11nB to valid state, thus setting the valid bit storing fields 111B to 11nB to invalid state indicates that an access to all the area of the memory 15 is prohibited.

The process to switch programs executed by the CPU 10 is performed by a system program. For example to switch from an application A to an application B, a system program responsible for switching processes is launched and executed by the CPU 10 so as to update the setting of the protection setting register group 11 according to the program B to be newly executed.

Figure 2A:
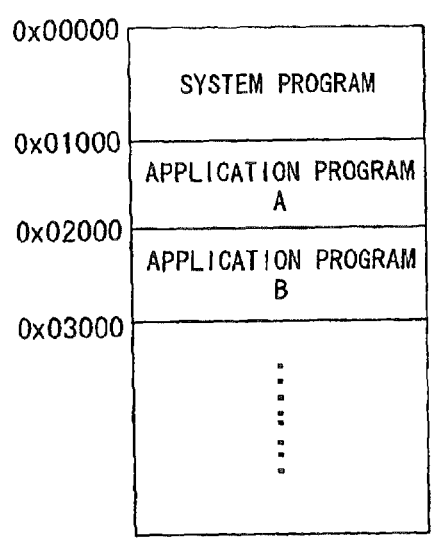
FIGS. 2A and 2B are views showing illustrative examples of memory maps.
Figure 2B:
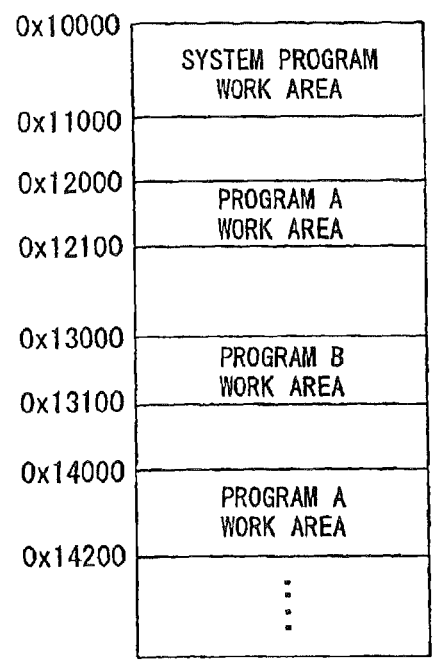

An illustrative example of updating the setting of the protection setting register group 11 is described hereinafter in detail with reference to FIGS. 2A and 2B. FIGS. 2A and 2B are illustrative example of memory maps when the memory 15 is ROM and RAM. FIG. 2A is a memory map example of a ROM, where the system program is stored in addresses 00000 to 00FFF, the application program A is stored in addresses 01000 to 01FFF and the application program B is stored in addresses 02000 to 02FFF. Further, FIG. 2B is a view showing an example of a memory map of RAM, where addresses 10000 to 10FFF are used as a work area for the system program, addresses 12000 to 120FF and 14000 to 141FF are used as a work area for the application program A and addresses 13000 to 130FF is used as a work area for the application program B.

Figure 3A:
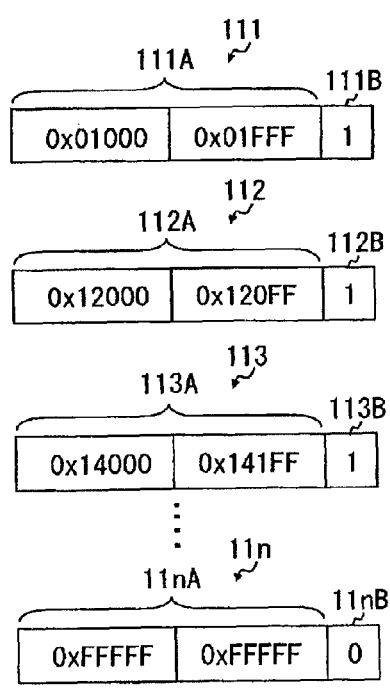
FIGS. 3A and 3B are views showing configuration examples of protection setting register groups.
Figure 3B:
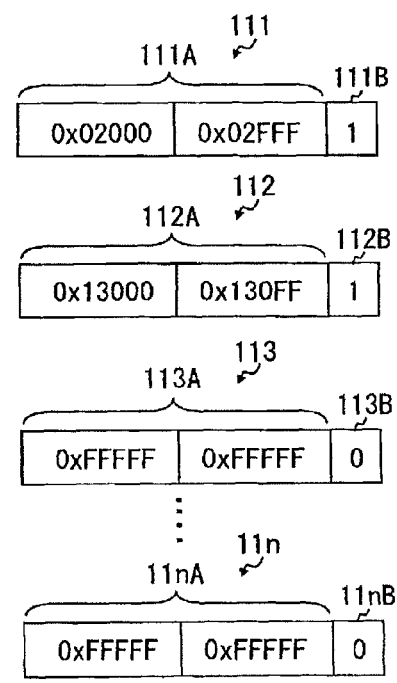

The setting of the protection setting register group 11 corresponding to the application program A is shown in FIG. 3A. In FIG. 3A, the protection setting register 111 specifies access permission to the storage area of the application program A in ROM and the protection setting registers 112 and 113 specify an access permission to the work area in RAM. On the other hand, the setting of the protection setting register group 11 corresponding to the application program B is shown in FIG. 3B. In FIG. 3B, the protection setting register 111 specifies an access permission to the storage area of the application program B in ROM and the protection setting registers 112 and 113 specify an access permission to the work area in RAM.

To switch the program to be executed by the CPU 10 from the application program A to the application program B, the valid bit storing field 113B of the protection setting register 113 needs to be rewritten to "0" that indicates an invalid state. At this time, after invalidating all the setting of the protection setting register group 11 at a time by the reset apparatus 16, the microcomputer 1 writes the setting of memory protection information, which is the setting of the access permission area, for the application program B to be newly executed. The updating process of the memory protection information carried out by the microcomputer 1 is described in detail with reference to the flowchart of FIG. 4.

In step S101, program information relating to a program to be newly executed is retrieved by a system program. The program information here is the information indicating the memory area to be allowed to use for the program executed by the CPU 10. In step 102, the reset apparatus 16 received with a reset request signal sent from the CPU 10 sends a valid bit reset signal to the protection setting registers 111 to 11n to reset all the valid bit storing fields 111B to 11nB at a time.

In steps S103 to S107, the memory protection setting according to the program newly executed is configured by the system program. Hereinafter, it will be assumed that the memory space for the memory 15 is divided in n number of areas and access permissions are set to each area. Specifically, in step S103, the value of a variable K is set to 1. In step S104, the protection information relating to the program to be newly executed that is retrieved in step S101 is referred to determine whether to permit an access to the area K. If the area K is an area allowed for access, the area K is set as an accessible area in one of the protection setting registers 111 to 11n and a valid bit in the protection setting register is set to valid state (step S105).

In step S106, the value of the variable K is incremented and if the value of the variable K is smaller than n (step S107), the process returns to the step S104 to repeat the process after S104. On the other hand, if processes are performed to all of n number of the areas, the updating process of the memory protection information is completed.

As described in the foregoing, the conventional microcomputer sequentially rewrites the protection setting register at a switching of executing programs. Accordingly the protection setting register is likely to be failed being rewritten. For example to set an area for allowing a memory access to the memory protection setting register, if the setting for previous program remains after switching between the programs, a memory area not supposed to allow an access can be accessed, causing to unable to detect unauthorized memory accesses. Further to set the area to prohibit a memory access to the memory protection setting register, if the setting for the previous program remains after switching the programs, there may be a problem generated in an execution of an application program.

On the other hand, the microcomputer 1 of this embodiment configures the memory protection information for a program to be newly executed after invalidating all memory protection information for the past executed program that are defined by the protection setting register group 11. This prevents the memory protection information for the past executed program from remaining after switching the programs and also improves reliability of memory protection.

Second Embodiment

Figure 5:
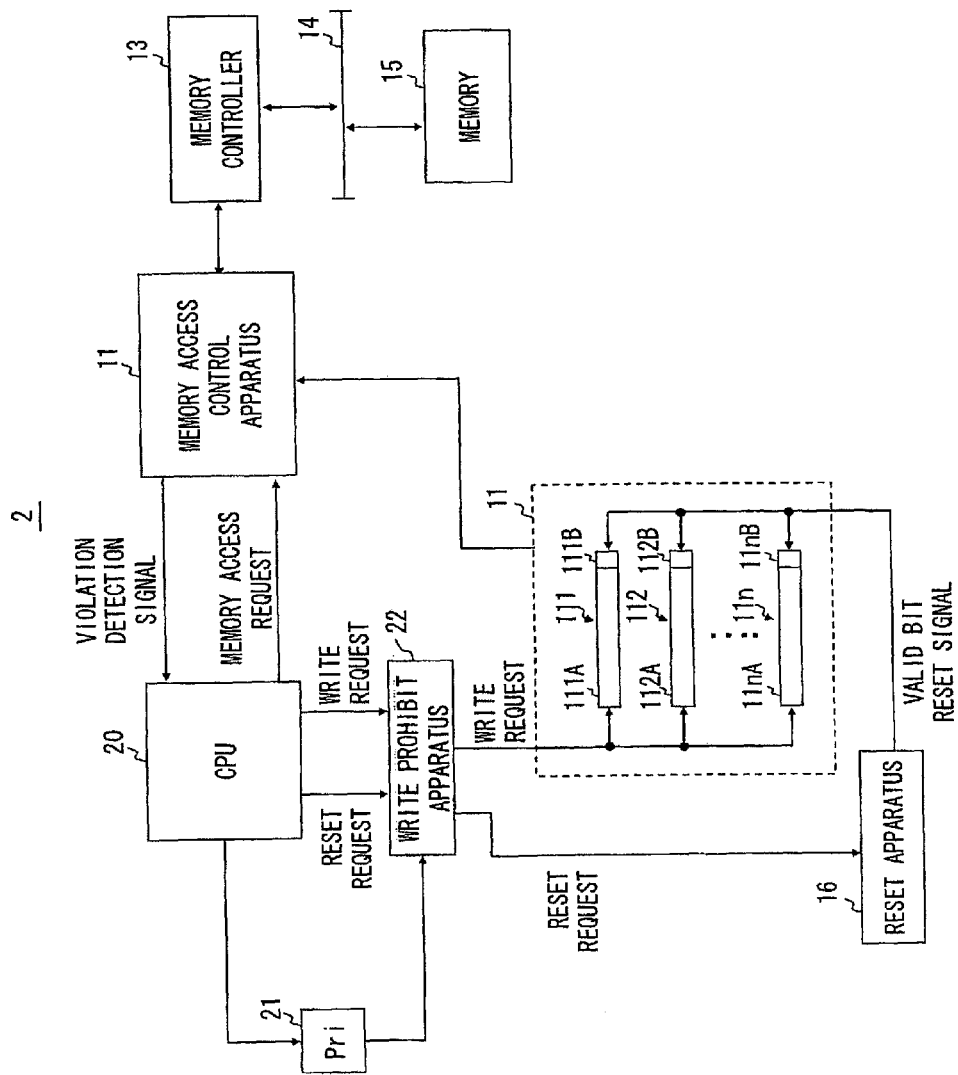
FIG. 5 is a configuration diagram of a microcomputer according to a second embodiment of the present invention.

The configuration of a microcomputer 2 of this embodiment is shown in FIG. 5. The microcomputer 2 is different from the microcomputer 1 of the first embodiment in that it includes a privileged bit storage 21 and write prohibit apparatus 22.

The privileged bit storage 21 stores a privileged bit indicating whether the reset apparatus 16 can be activated and the protection setting register group 11 can be updated. For example, the privileged bit may be 1 bit data, where a privilege mode enabling to activate the reset apparatus 16 and update the protection setting register group 11 may be the value "1", whereas a non-privilege mode not enabling to activate the reset apparatus 16 and update the protection setting register group 11 may be the value "0". The value of the privileged bit storage 21 may be rewritten by a system program executed in the CPU 20 but cannot be rewritten by an application program.

The write prohibit apparatus 22 inputs a reset request for the reset apparatus 16 and a write request for the protection setting register group 11 from the CPU 20 and only when the value stored to the privileged bit storage 21 indicates the privilege mode, the reset and write requests are transferred to the reset apparatus 16 and protection setting register group 11.

Incidentally, the CPU 20 is identical to the CPU 10 of the first embodiment except that the CPU 20 rewrites the privileged bit storage 21.

As other elements than the privileged bit storage 21, write prohibit apparatus 22 and CPU 20 are identical to those included in the microcomputer 1 of the first embodiment, detailed description will not be repeated here.

Figure 4:
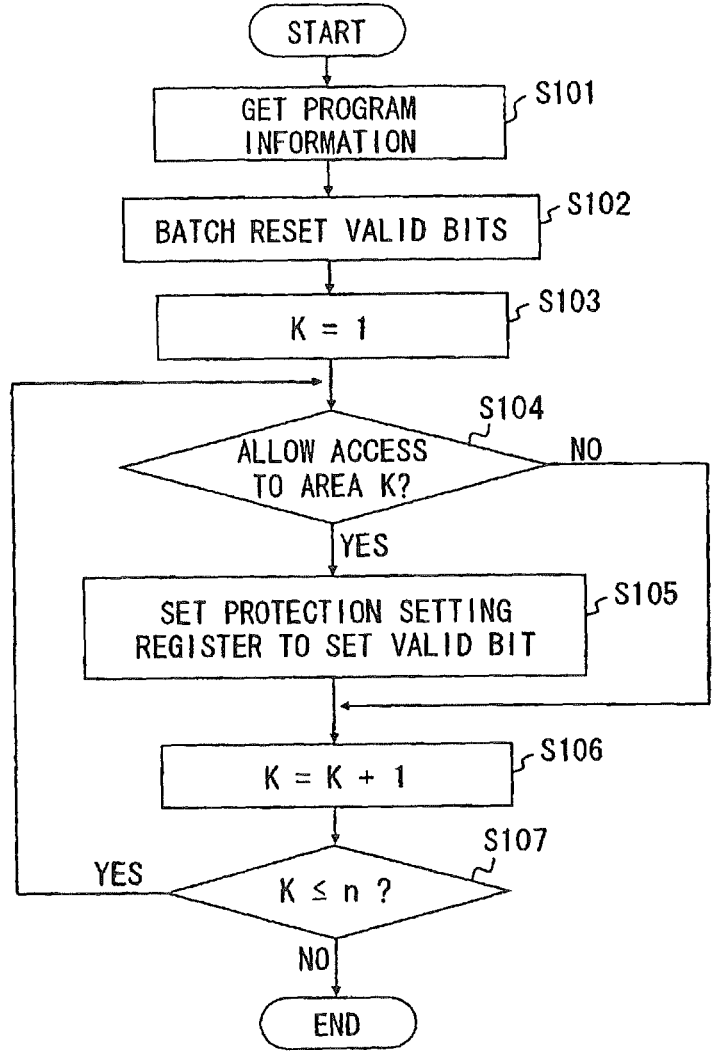
FIG. 4 is a flowchart illustrating an update process of memory protection information carried out by the microcomputer according to the first embodiment of the present invention.
Figure 6:
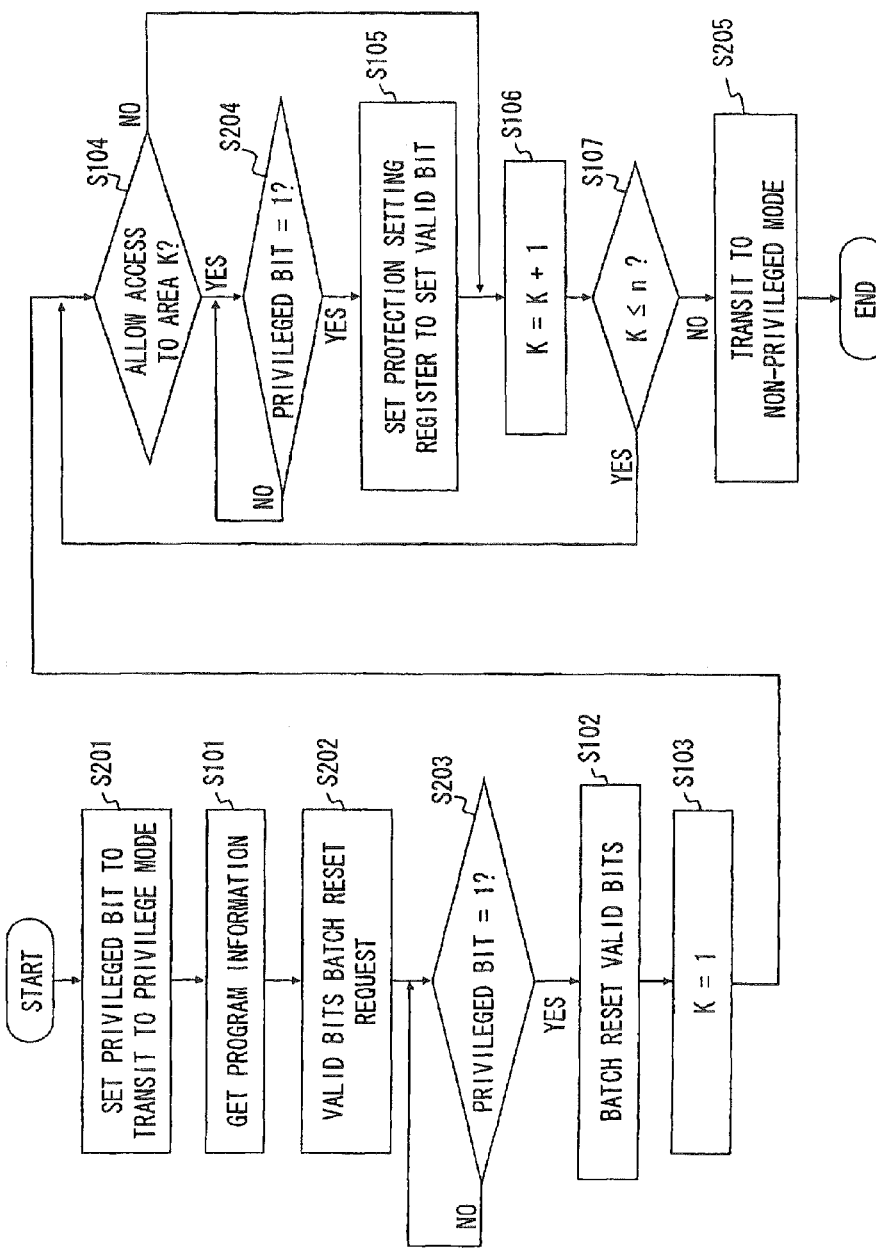
FIG. 6 is a flowchart illustrating an update process of memory protection information carried out by the microcomputer according to the second embodiment of the present invention.

The updating process of the memory protection information carried out by the microcomputer 2 is described hereinafter in detail with reference to the flowchart of FIG. 6. Note that in FIG. 6, identical steps as in the flowchart of FIG. 4 are denoted by reference numerals.

In step S201, a privileged bit in the privileged bit storage 21 is updated according to an instruction from a system program and the microcomputer 2 transits to the privileged mode. In step S202, a reset request for the valid bit storing fields 111B to 11nB is output from the CPU 20 to the reset apparatus 16. In step S203, the write prohibit apparatus 22 refers to the privileged bit storage 21 and only when a value indicates the privileged mode (which is "1" in this example), the reset request is transferred to the reset apparatus 16. The reset apparatus 16 received with the reset request from the write prohibit apparatus 22 sends the valid bit reset signal to the protection setting registers 111 to 11n to reset all the valid bit storing fields 111B to 11nB to invalid state at a time (step S102).

In the rewriting process of the protection setting register group 11 indicated in the steps S103 to S107, step S24 is specific to this embodiment. In step S204, the write prohibit apparatus 22 refers to the privileged bit storage 21 and only when a value indicates the privileged mode (which is "1" in this example), the write request input from the CPU 20 is transferred to the protection setting register group 11. In the last step S205, by rewriting the privileged bit storage 22 to a value indicating a non-privileged mode, the microcomputer 2 transits to the non-privileged mode.

As the microcomputer 1 of the first embodiment does not consider the condition to reject a write request to the protection setting register group 11, the protection setting register group 11 may be rewritten by a write request that is generated by an application program. On the other hand in the microcomputer 2 of this embodiment, a write request issued while in a state not transit to the privileged mode is rejected by the write prohibit apparatus 22. Further, the transition to the privileged mode is performed by rewriting the privileged bit storage 21 by a system program. Accordingly in the write request by an application program executed in a non-privileged mode, the protection setting register group 11 will not be rewritten. This helps prevent from changing the memory protection setting by a malicious application program.

Third Embodiment

Figure 7:
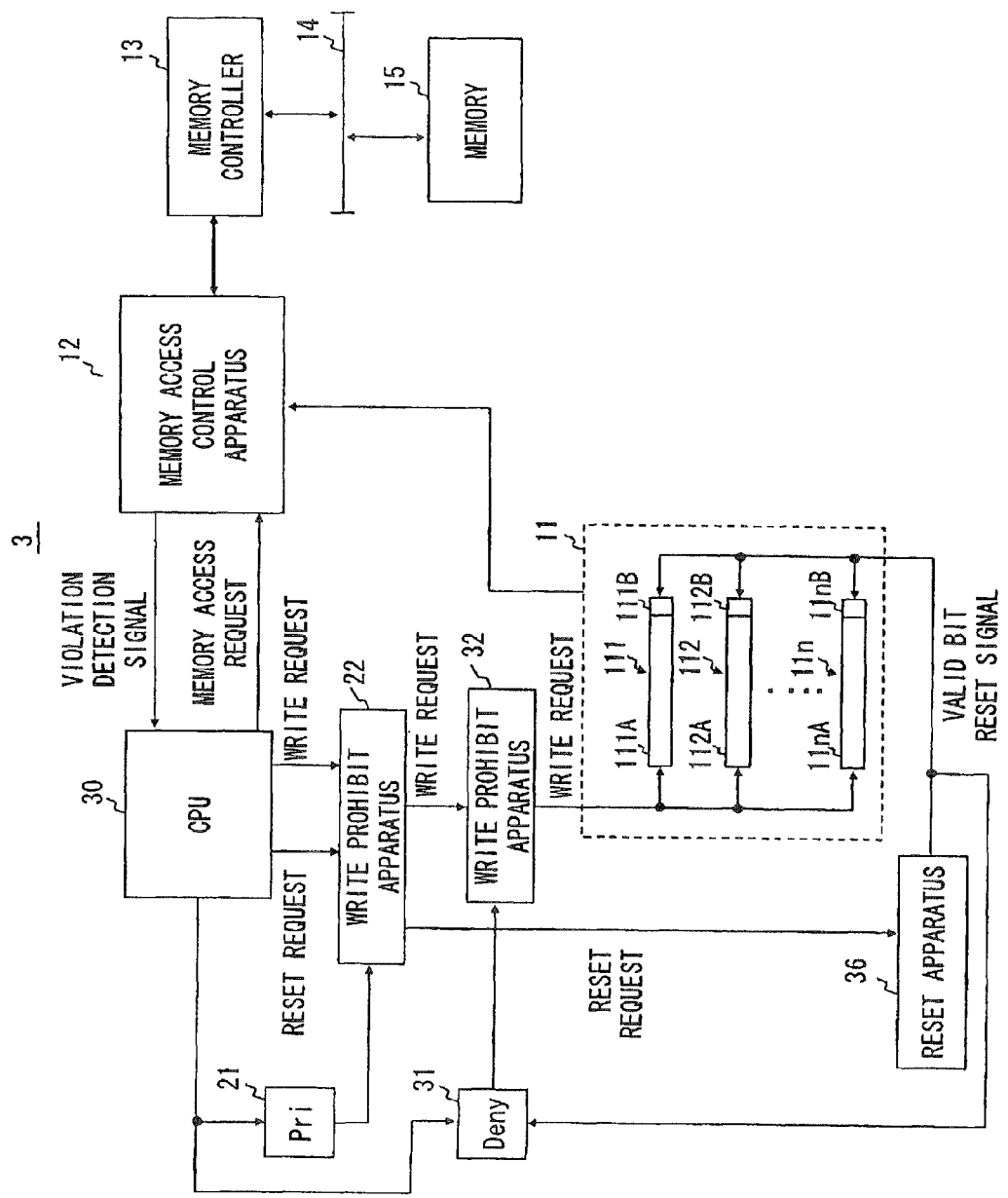
FIG. 7 is a configuration diagram of a microcomputer according to a third embodiment of the present invention.

The configuration of a microcomputer 3 of this embodiment is shown in FIG. 7. The microcomputer 3 is different from the microcomputer 2 in that it includes a write prohibit bit storage 31 and a write protection apparatus 32.

The write prohibit bit storage 31 stores a write prohibit bit indicating whether it is possible to write to the protection setting register group 11. For example the write prohibit bit may be 1 bit data, where a prohibit state that prohibits from writing the protection setting register group 11 may be the value "1" whereas an allowed state that allows to write to the protection setting register group 11 may be the value "0". As described in the foregoing, setting to the state prohibiting to write to the protection setting register group 11 is carried out by a system program executed in the CPU 20. Further, setting to the state allowing to write to the protection setting register group 11 is carried out by the reset apparatus 36.

The writing prohibit apparatus 32 inputs a write request for the protection setting register group 11 from the write prohibit apparatus 22. Further, only when a value stored in the write prohibit bit storage 31 indicates to allow writing, the write request input from the write prohibit apparatus 22 is transferred to the reset apparatus 16 or protection setting register group 11.

The CPU 30 is identical to the CPU 20 of the second embodiment of the present invention except that the CPU 30 rewrites the write prohibit bit storage 31. Further, the reset apparatus 36 is identical to the reset apparatus 16 of the first embodiment excluding that the reset apparatus 36 rewrites the write prohibit bit storage 31.

Elements included in the microcomputer 3 are identical to those in the abovementioned microcomputer 1 or 2 excluding the write prohibit bit storage 31, write prohibit apparatus 32, CPU 30 and reset apparatus 36.

Figure 8:
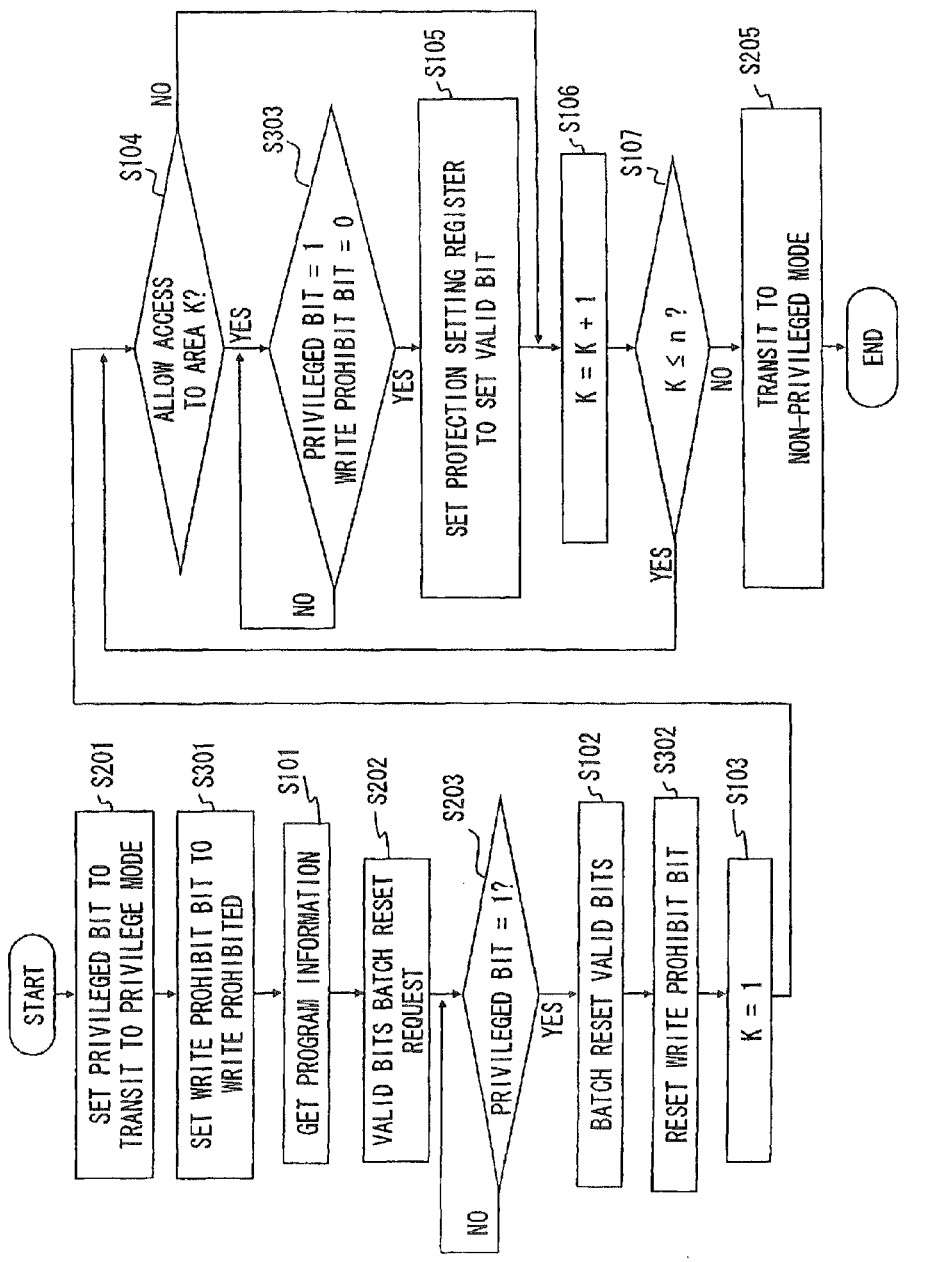
FIG. 8 is a flowchart illustrating an update process of memory protection information carried out by the microcomputer according to the third embodiment of the present invention.

The updating process of the memory protection information carried out by the microcomputer 3 is described hereinafter in detail with reference to the flowchart of FIG. 8. Note that in FIG. 8, identical steps as in the flowchart of FIGS. 4 and 6 are denoted by reference numerals.

In step S301, the write prohibit bit storage 31 is set to a value indicating the write prohibit state (which is "1" in this example) by an instruction from a system program. In step S302, in accordance with that all the valid bit storing fields 111B to 11nB being reset to invalid state by the reset apparatus 36, the value of the write prohibit bit storage 31 is reset to a value indicating the write allowed state (which is "0" in this example) (steps S102 and S302). Resetting the write prohibit bit storage 31 may be carried out by inputting the valid bit reset signal for resetting the valid bit storing fields 111B to 11nB to the write prohibit bit storage 31.

In the rewriting process of the protection setting register group 11 from the steps S103 to S107 that follow, step S303 is specific to this embodiment. In step S303, the write prohibit apparatus 32 refers to the write prohibit bit storage 31 and only when in the allowed state where a writing to the protection setting register group 11 is allowed, the write request input from the write prohibit apparatus 22 is transferred to the protection setting register group 11.

To allow writing to the protection setting register group 11, the microcomputers 1 and 2 of the first and second embodiments do not impose a condition that all the valid bit storing fields 111B to 11nB are set to invalid state by the reset apparatus 16. Accordingly in updating the protection setting register group 11 at a switching of programs, the protection setting registers may be failed to set to invalid state.

On the other hand in the microcomputer 3, when the write request to the protection setting register group 11 is issued while a value stored to the write prohibit bit storage 31 indicates the write prohibit state, the write request is rejected by the write prohibit apparatus 32. Further in the microcomputer 3, a condition for the value of the write prohibit bit storage 31 to be the write allowed state is that a reset operation is processed by the reset apparatus 36, where the reset operation is to set all the valid bit storing fields 111B to 11nB to invalid state. Accordingly in the microcomputer 3, when all the valid bit storing fields 111B to 11nB are not set to invalid state, the protection setting register group 11 will not be rewritten, thereby assuring the protection setting register to be all set to invalid.

Fourth Embodiment

Figure 9:
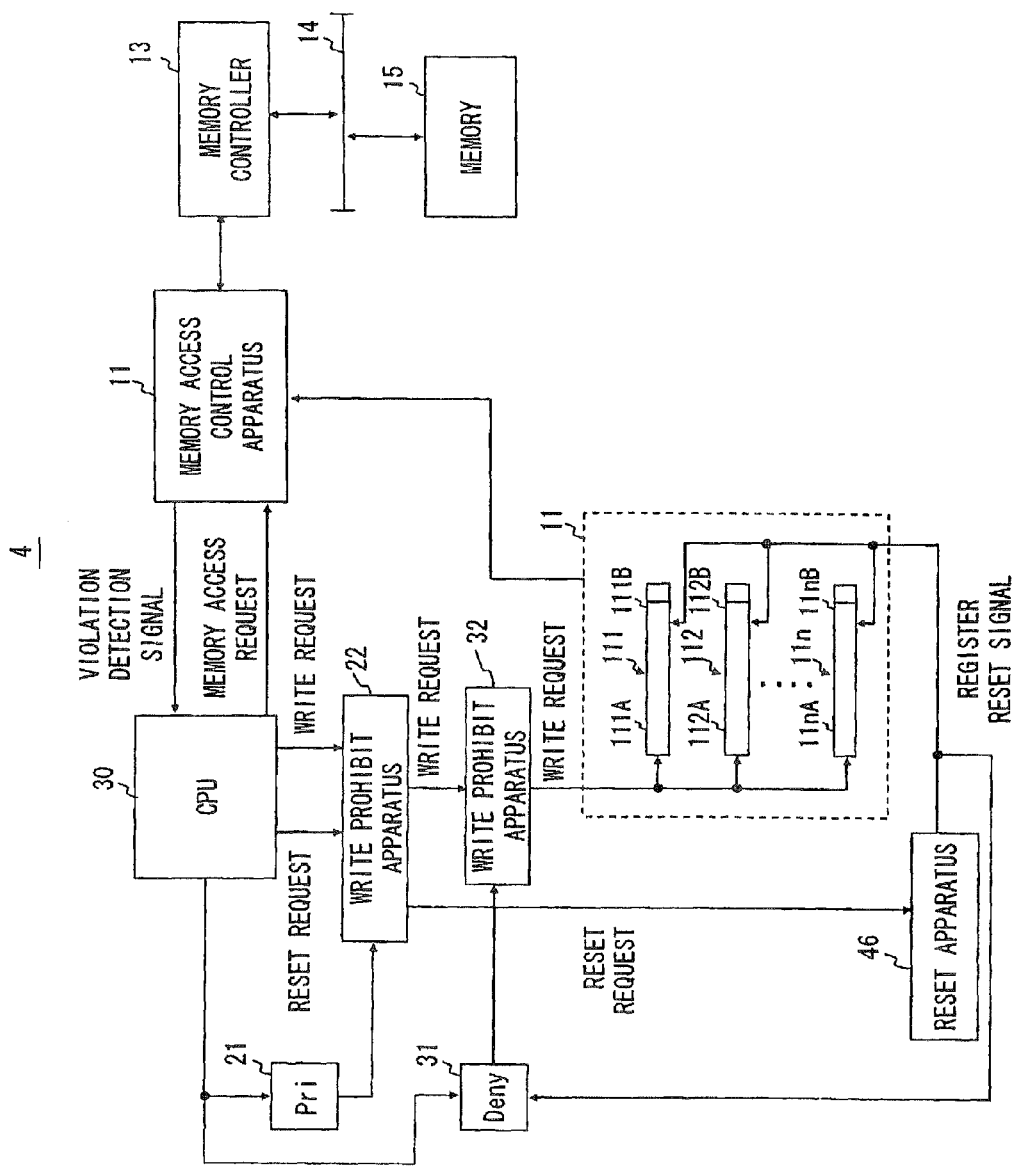
FIG. 9 is a configuration diagram of a microcomputer according to a fourth embodiment of the present invention.

The configuration of a microcomputer 4 of this embodiment is shown in FIG. 9. The microcomputer 4 is characterized by that the entire protection setting registers 111 to 11n including the area specifying fields 111A to 11nA is the target to be reset by a reset apparatus 46, not only the valid bit storing fields 111B to 11nB. Resetting the area specifying fields 111A to 11nA may be performed by setting the values stored therein to a predetermined invalid value. The invalid value may be a value not corresponding to any area of the memory space.

For example the area specifying fields 111A to 11nA may be set to all 0 or 1. Furthermore, if the area specifying fields 111A to 11nA include size information of the access permission area, the size of the access permission area may be set to 0.

As other elements than the reset apparatus 46 are identical to the components included in the abovementioned microcomputer 3, detailed explanation will not be repeated here.

In the abovementioned microcomputers 1 to 3, the reset range by the reset apparatus is only the valid bit storing fields 111B to 11nB. Accordingly even though the valid bit storing fields 111B to 11nB are updated to valid state according to the write request output from the CPUs 10 to 30, if the values of the corresponding area specifying fields 111A to 11nA are not set, incorrect memory protection information can be valid.

On the other hand in the microcomputer 4, the entire protection setting registers 111 to 11nb including the area specifying field 111A to 11nA are to be reset by the reset apparatus 46, not only the valid bit storing fields 111N to 11nB. Therefore, even through a situation that the area specifying fields 111A to 11nA are not updated and the valid bit storing fields 111B to 11nB are valid, the values of the area specifying fields 111A to 11nB in this case are invalid values. Thus it is possible to prevent from allowing unauthorized memory accesses.

Other Embodiment

In the first to fourth embodiments, the processes performed by the reset apparatus 16, 36 and 46 may be realized by the CPUs 10, 20 or 30 and programs executed by the CPU 10, 20 or 30. Specifically, before writing the protection setting registers 111 to 11n according to the switching process of the executing programs, a program which makes the CPU 10 to invalidate the protection setting registers 111 to 11n is executed.

However as with the microcomputer 1, it is desirable to have the configuration having a reset apparatus 16 independent of the CPU 10 and the reset apparatus 16 sets the protection setting register group 11 to invalid according to a reset request signal output from the CPU 10. With such configuration, by executing a small number of instructions, specifically by executing one instruction for sending the reset request signal, an incorrect memory protection setting can be excluded.

Further in the abovementioned first to fourth embodiments, an area allowing a memory access by the programs executed by the CPU 10, 20 and 30 are set to the protection setting registers 111 to 11n. However for the protection setting registers 111 to 11n, an area prohibiting an access may be set, or an allowed and prohibit areas may be set.

In the first to fourth embodiment of the present invention, the configuration has been explained that indicates whether the setting of the protection setting registers 111 to 11n are valid or not by the valid bit storing fields 111B to 11nB. However the configuration for determining whether the setting of the protection setting registers 111 to 11n is valid or not is not limited to this configuration. For example as disclosed by Infineon Technologies, determining whether the setting of the protection setting registers 111 to 11n may be determined according to identifiers indicating whether to allow/prohibit a write access, read access and execution. In this case, setting write, read accesses and execution to all prohibited corresponds to setting the setting of the protection setting registers 111 to 11n to invalid state.

Further in the first to fourth embodiment described in the foregoing, each of the protection setting registers 111 to 11n includes the area specifying field and the valid bit storing field. However an area for storing the memory protection information and an area for storing information defining the validity of the memory protection information may be physically independent storage unit.

In the first to fourth embodiment of the present invention, the memory space with access control according to the setting information of the protection setting registers 111 to 11n is not limited to the memory space corresponding to all of the memory 15. For example to define an area uniformly prohibiting an access by an application program to the memory 15 such as a storage area of a system program, areas other than the region uniformly prohibiting accesses may be the target for access control by the protection setting registers 111 to 11n.

In the first to forth embodiment described in the foregoing, the memory 15 may be provided external to the microcomputers 1 to 4. Further, the configuration in which the memory access control apparatus 12 and memory 15 are connected via the memory controller 13 is illustrative only. For example to do a DMA (Direct Memory Access) transfer, the memory access control apparatus 12 and memory 15 may be connected via a DMA controller for controlling the DMA transfer.

It is apparent that the present invention is not limited to the above embodiment and it may be modified and changed without departing from the scope and spirit of the invention.

What is claimed:

1. A microcomputer comprising:
   a CPU (central processing unit);
   a protection information storage configured to store memory protection information specifying an access permission or a prohibited state to a memory space by a program executed by the CPU;
   a memory access control apparatus configured to determine whether or not to allow a memory access request from the CPU according to the memory protection information; and
   a reset apparatus configured to invalidate the memory protection information stored in the protection information storage according to a reset request signal output from the CPU in response to a switching of programs executed by the CPU, the reset request signal being based on a state of execution of the program by the CPU,
   wherein the reset apparatus sets all valid bit storing fields of a plurality of protection setting registers of the protection information storage to invalid state in response to the reset request signal output by the CPU.

2. The microcomputer according to claim 1, further comprising:
   a first storage to store first identification information indicating whether or not an authority to invalidate the memory protection information exists; and
   a first evaluation unit configured to evaluate whether or not the reset apparatus is activated according to the first identification information stored in the first storage.

3. The microcomputer according to claim 1, further comprising:
   a second storage to store second identification information indicating a setting of the protection information storage is already invalidated; and
   a second evaluation unit to evaluate whether or not to allow writing to the protection information storage according to the second identification information stored in the second storage.

4. The microcomputer according to claim 1, wherein the protection information storage comprises:
   an area specifying field configured to specify a memory space to be protected; and
   a third storage configured to store third identification information indicating whether or not a setting of the area specifying field is valid, and the reset apparatus invalidates the memory protection information by updating the third identification information stored in the third storage.

5. The microcomputer according to claim 1, wherein the protection information storage comprises:
   an area specifying field configured to specify a memory space to be protected; and
   a third storage configured to store third identification information indicating whether or not a setting of the area specifying field is valid, and the reset apparatus invalidates the memory protection information by deleting the setting of the area specifying field and updating the third identification information stored in the third storage.

6. A microcomputer comprising:
   a CPU (central processing unit) configured to switch a plurality of programs to execute;
   a plurality of protection information storages configured to store memory protection information specifying either an access permission or a prohibited state to a memory space by a program of the plurality of programs executed by the CPU;
   a memory access control unit configured to evaluate whether or not to allow a memory access request from the CPU according to the memory protection information;
   an invalidating unit configured to invalidate all of the plurality of protection information storages in response to a switching of programs executed by the CPU, thereby invalidating memory protection information corresponding to a previously executed program retained in the plurality of protection information storages; and
   an updating unit configured to update content of the plurality of protection information storages by memory protection information corresponding to a newly executed program by the CPU after invalidating the memory protection information by the invalidating unit.

7. The microcomputer according to claim 6, further comprising a first evaluation unit to evaluate whether or not to allow an invalidation of the protection memory protection information according to whether or not an authority to invalidate the memory protection information exists.

8. The microcomputer according to claim 6, further comprising a second evaluation unit to prohibit from updating the plurality of protection information storages by the updating unit in case the setting of the plurality of protection information storages is not invalidated by the invalidating unit.

9. The microcomputer according to claim 6, wherein the invalidating unit comprises a reset apparatus to invalidate the memory protection information stored in the plurality of protection information storages according to a reset request signal output from the CPU.

10. The microcomputer according to claim 6, wherein each of the plurality of protection information storages comprises:
    an area specifying field configured to specify a memory space to be protected; and
    a third storage configured to store third identification information indicating whether or not a setting of the area specifying field is valid, and the invalidating unit invalidates the memory protection information by updating the third identification information stored in the third storage.

11. The microcomputer according to claim 6, wherein each of the plurality of protection information storages comprises:
    an area specifying field configured to specify a memory space to be protected; and
    a third storage configured to store third identification information indicating whether or not a setting of the area specifying field is valid, and the invalidating unit invalidates the memory protection information by deleting the setting of the area specifying field and updating the third identification information stored in the third storage.

12. A method for controlling memory accesses of a microcomputer, the microcomputer including a CPU (central processing unit), a plurality of protection information storages configured to store memory protection information indicating either an access permission or a prohibited state to a memory space by a program to be executed by the CPU and a memory access control unit configured to evaluate whether or not to allow a memory access request by the CPU according to the memory protection information, the method comprising:

invalidating all of the plurality of protection information storages in response to a switching of programs executed by the CPU, thereby invalidating past memory protection information corresponding to a previously executed program retained in the plurality of protection information storages; and updating content of the plurality of protection information storages by memory protection information corresponding to a newly executed program by the CPU after invalidating the memory protection information.

13. The microcomputer according to claim 1, wherein after the reset apparatus invalidates the memory protection information according to the CPU, the CPU rewrites a new memory protection information to the protection information storage for a work area of the memory space from another program for the CPU to switch to for execution.

14. The microcomputer according to claim 1, wherein the reset apparatus invalidates a predetermined portion of memory protection information stored in the protection information storage according to a switching of programs to be executed by the CPU corresponding to the predetermined portion of memory protection information.

15. The microcomputer according to claim 1, wherein the reset apparatus invalidates the memory protection information to switch to another program for execution by the CPU.

16. The microcomputer according to claim 1, wherein the reset apparatus configures the memory protection information for a program to be newly executed after invalidating all memory protection information for a past executed program defined by the protection information storage at the one time of receiving the reset signal.

17. The microcomputer according to claim 1, wherein the reset apparatus is configured to invalidate the memory protection information stored in the protection information storage according to a reset request signal output from the CPU prior to updating the memory protection information according to a second program to be newly executed by the CPU.

18. The microcomputer according to claim 1, wherein after invalidating all protection settings at a time by the reset apparatus, writing a second setting of memory protection information of an access permission area for a second program to be newly executed.

19. The microcomputer according to claim 1, wherein the reset apparatus is configured to invalidate the memory protection information stored in the protection information storage according to the reset request signal output from the CPU without resetting the CPU.

20. The microcomputer according to claim 1, wherein the reset apparatus is configured to invalidate the memory protection information stored in the protection information storage while switching from the program to a second program.

21. A microcomputer comprising:

a CPU (central processing unit);

a protection information storage configured to store memory protection information specifying an access permission or a prohibited state to a memory space by a program executed by the CPU;

a memory access control apparatus configured to determine whether or not to allow a memory access request from the CPU according to the memory protection information; and a reset apparatus configured to invalidate the memory protection information stored in the protection information storage according to a reset request signal output from the CPU in response to a switching of programs executed by the CPU, the reset request signal being based on a state of execution of the program by the CPU.

22. The microcomputer according to claim 21, wherein the reset apparatus sets a plurality of the valid bit storing fields of the plurality of protection setting registers of the protection information storage to invalid state in response to the reset request signal output by the CPU.

23. The microcomputer according to claim 21, wherein the reset apparatus sets at least one of valid bit storing fields of at least one of a plurality of protection setting registers of the protection information storage to invalid state in response to the reset request signal output by the CPU.

* * * * *

UNITED STATES PATENT AND TRADEMARK OFFICE
CERTIFICATE OF CORRECTION

| | | Page 1 of 1 |
|---|---|---|
| PATENT NO. | : 9,003,148 B2 | |
| APPLICATION NO. | : 13/665639 | |
| DATED | : April 7, 2015 | |
| INVENTOR(S) | : Rika Ono et al. | |

It is certified that error appears in the above-identified patent and that said Letters Patent is hereby corrected as shown below:

ON THE TITLE PAGE

Please insert:

--(60)  Related U.S. Application Data
Continuation of U.S. Patent Application No. 11/785,536, filed on April 18, 2007, now U.S. Patent No. 8,312,238.--

Signed and Sealed this
Twenty-third Day of February, 2016

Michelle K. Lee
*Director of the United States Patent and Trademark Office*